US012742419B1

(12) United States Patent
Miller et al.

(10) Patent No.: US 12,742,419 B1
(45) Date of Patent: Sep. 22, 2026

(54) TURBINE ENGINE HAVING A COMPRESSION SECTION

(71) Applicant: General Electric Company, Evendale, OH (US)

(72) Inventors: Brandon Wayne Miller, Middletown, OH (US); Scott Alan Schimmels, Miamisburg, OH (US); Mark Gregory Wotzak, Chestnut Hill, MA (US); Jeffrey Donald Clements, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/195,868

(22) Filed: May 1, 2025

(51) Int. Cl.
*F02C 7/18* (2006.01)
*F02C 3/06* (2006.01)
*F02C 7/28* (2006.01)

(52) U.S. Cl.
CPC .................. *F02C 7/18* (2013.01); *F02C 3/06* (2013.01); *F02C 7/28* (2013.01); *F05D 2260/22141* (2013.01); *F05D 2260/232* (2013.01)

(58) Field of Classification Search
CPC ...... F02C 7/18; F02C 7/28; F02C 3/06; F05D 2260/22141; F05D 2260/232
See application file for complete search history.

(56) References Cited

U.S. PATENT DOCUMENTS 2,584,899 A * 2/1952 Mcleod .................. F01D 11/24 60/806
4,820,116 A * 4/1989 Hovan ..................... F01D 1/32 415/115
4,880,354 A * 11/1989 Teranishi ................ F01D 25/10 416/198 A
4,919,590 A * 4/1990 Stratford ............... F04D 29/321 60/726
5,297,386 A * 3/1994 Kervistin .............. F04D 29/584 415/115
5,639,212 A * 6/1997 Schaefer ............... F01D 17/162 415/173.1
5,685,158 A * 11/1997 Lenahan ............... F04D 29/584 60/726
5,704,764 A * 1/1998 Chupp .................... F01D 5/082 416/198 A
6,382,903 B1 * 5/2002 Caruso .................. F01D 25/10 416/198 A
6,558,114 B1 * 5/2003 Tapley .................... F01D 5/081 415/231

(Continued)

FOREIGN PATENT DOCUMENTS

EP 3176409 A1 * 6/2017 ......... F04D 29/5826
FR 3097596 A1 12/2020

*Primary Examiner* — Craig Kim
(74) *Attorney, Agent, or Firm* — McGarry Bair PC

(57) ABSTRACT

A turbine engine has an engine core, a plurality of axially arranged stages, an interstage cavity and a cooling airflow circuit. The engine core has a compression section, a combustion section and a turbine section. The plurality of axially arranged stages within the compression section have a low pressure (LP) set of stages and high pressure (HP) set of stages. The HP set of stages include a first HP stage and a second HP stage. The interstage cavity is formed between the first HP stage and the second HP stage. The cooling air circuit extends between the set of LP stages and the interstage cavity.

20 Claims, 5 Drawing Sheets

(56) References Cited

U.S. PATENT DOCUMENTS

| | | | | |
|---|---|---|---|---|
| 9,145,771 | B2 * | 9/2015 | Malmborg | F01D 5/087 |
| 9,719,425 | B2 * | 8/2017 | Roush | F01D 5/082 |
| 10,260,365 | B2 | 4/2019 | Wilber | |
| 10,584,594 | B2 * | 3/2020 | Neeli | F01D 5/187 |
| 10,815,805 | B2 * | 10/2020 | Johnson | F01D 9/065 |
| 11,002,143 | B2 | 5/2021 | Vetters | |
| 11,391,176 | B2 * | 7/2022 | Johnson | F01D 11/001 |
| 11,466,590 | B1 | 10/2022 | St-Laurent | |
| 11,525,400 | B2 * | 12/2022 | Namadevan | F01D 5/084 |
| 12,066,027 | B2 * | 8/2024 | Lawlor | F04D 21/00 |
| 12,303,966 | B1 * | 5/2025 | Liang | B21F 23/00 |
| 12,398,671 | B2 * | 8/2025 | Shinde | F02C 6/08 |
| 2012/0027606 | A1 * | 2/2012 | Malmborg | F04D 29/321<br>416/214 R |
| 2012/0060507 | A1 * | 3/2012 | King | F01D 11/04<br>60/785 |
| 2013/0028750 | A1 * | 1/2013 | Dombek | F01D 5/081<br>416/90 R |
| 2013/0170954 | A1 * | 7/2013 | Pauli | F01D 5/082<br>415/115 |
| 2017/0234135 | A1 * | 8/2017 | Takamura | F02C 6/08<br>415/116 |
| 2024/0026821 | A1 * | 1/2024 | Shinde | F02C 7/12 |

* cited by examiner

TURBINE ENGINE HAVING A COMPRESSION SECTION

TECHNICAL FIELD

The disclosure generally relates to a turbine engine, specifically, towards a compression section of the turbine engine.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation, air is brought into the compression section through the fan section where it is then pressurized in the compressor and mixed with fuel and ignited in the combustor for generating hot combustion gases which flow downstream through the turbine stages where the air is expanded and exhausted out an exhaust section. The expansion of the air in the turbine section is used to drive the rotating sections of the fan section and the compression section. The drawing in of air, the pressurization of the air, and the expansion of the air is done, in part, through rotation of various rotating blades mounted to respective disks throughout the fan section, the compression section, and the turbine section, respectively. The rotation of the rotating blades imparts mechanical stresses along various portions of the blade; specifically, where the blade is mounted to the disk.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
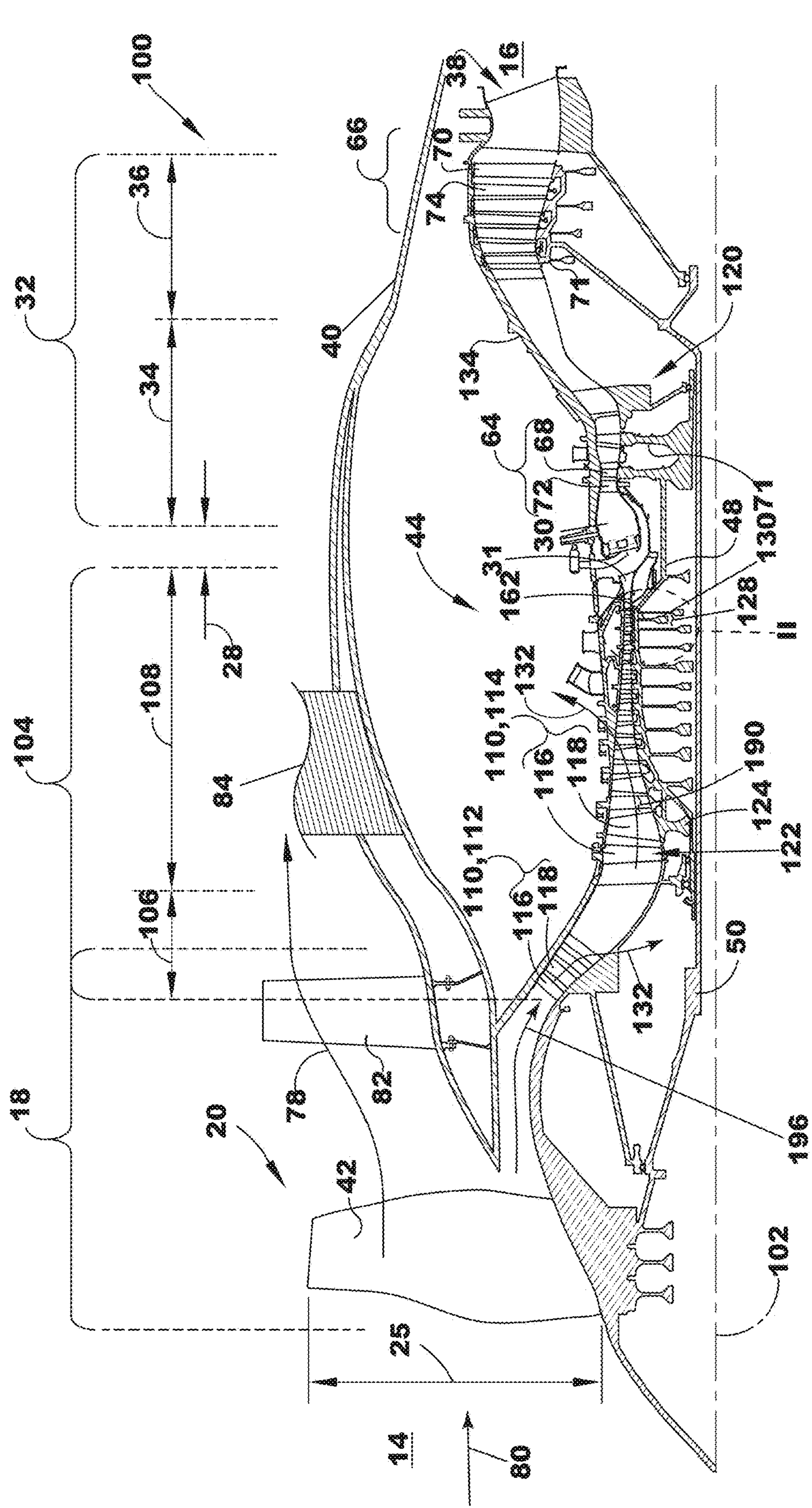
FIG. 1 is a schematic cross-sectional view of a turbine engine having a compression section, a combustion section, and a turbine section in accordance with various aspects described herein.

Aspects of the disclosure herein are directed to a turbine engine having a compression section, a turbine section, and an engine centerline. The turbine engine has a set of HP stages are defined as stages of the plurality of axially arranged stages that are either driven by the HP turbine or drivingly coupled to the HP compressor. Each stage of the plurality of axially arranged stages can include a rotatable disk that is rotationally coupled to the set of circumferentially spaced blades. An interstage cavity is formed between two axially adjacent rotatable disks of the set of HP stages. The turbine engine can include at least one of a hoop stiffener, a set of fins, or a combination thereof located within the interstage cavity.

The set of fins and the hoop stiffener are used to direct a flow of cooling fluid (e.g., bleed air) against the rotatable disk. The cooling of the rotatable disk, in turn, allows for a compression section to operate with higher temperatures and higher pressures, thus increasing the overall efficiency of the turbine engine. For purposes of illustration, the present disclosure will be described with respect to a turbine engine being an unducted turbine engine. It will be understood, however, that aspects of the disclosure described herein are not so limited and can have general applicability within other engines or within other portions of the turbine engine. For example, the disclosure can have applicability for turbine engines in other engines or vehicles. It will be appreciated that the turbine engine can be any suitable engine such as, but not limited to, a turboprop engine, a turboshaft engine, a ducted turbofan engine, an unducted engine, or an open rotor turbine engine As used herein, the term “upstream” refers to a direction that is opposite the fluid flow direction, and the term “downstream” refers to a direction that is in the same direction as the fluid flow. The term “fore” or “forward” means in front of something and “aft” or “rearward” means behind something. For example, when used in terms of fluid flow, fore/forward can mean upstream and aft/rearward can mean downstream.

Additionally, as used herein, the terms “axial” and “longitudinal” both refer to a direction parallel to a centerline axis of an object, while the terms “radial” or “radially” refer to a direction that is perpendicular to the axial direction or away from a common center. For example, in the overall context of a turbine engine, radial refers to a direction along a ray extending between a center longitudinal axis of the engine and an outer engine circumference. Furthermore, as used herein, the term “set” or a “set” of elements can be any number of elements, including only one.

Further, as used herein, the term “fluid” or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be another suitable turbine engine such as, but not limited to, a steam turbine engine or a supercritical carbon dioxide turbine engine. As a non-limiting example, the term “fluid” can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "overall pressure ratio" (OPR), or overall compression ratio, as used herein, is a ratio of a total pressure immediately downstream of a last stage of a compressor section (e.g., between the last stage of the compressor section and a combustion section) of a turbine engine to a total pressure immediately upstream of an inlet of the fan section (e.g., at a location where an ambient airflow is drawn into the turbine engine). The OPR can be determined based on a predetermined thrust of the turbine engine, such as a nameplate rated thrust.

FIG. 1 is a schematic cross-sectional diagram of a turbine engine 100, specifically an open rotor or unducted turbine engine for an aircraft although the disclosure is not so limited. The turbine engine 100 has a generally longitudinally extending axis or engine centerline 102 extending from a forward end 14 to an aft end 16. The turbine engine 100 includes, in downstream serial flow relationship, a set of circumferentially spaced blades or propellers defining a fan section 18 including a fan 20, a compression section 104 including a booster or low pressure (LP) compressor 106 and a high pressure (HP) compressor 108, a combustion section 28 including a combustor 30, a turbine section 32 including an HP turbine 34, and an LP turbine 36, and an exhaust section 38. The turbine engine 100 as described herein is meant as a non-limiting example, and other architectures are possible, such as, but not limited to, a steam turbine engine, a supercritical carbon dioxide turbine engine, or any other suitable turbine engine.

A housing or nacelle 40 of the turbine engine 100 extends from the forward end 14 of the turbine engine 100 toward the aft end 16 of the turbine engine 100 and covers at least a portion of the compression section 104, the combustion section 28, the turbine section 32, and the exhaust section 38. The fan section 18 can be positioned at a forward portion of the nacelle 40 and extend radially outward from the nacelle 40 of the turbine engine 100. Specifically, the fan section 18 extends radially outward from the nacelle 40. The fan section 18 includes a set of fan blades 42, and a set of fan vanes 82 downstream the set of fan blades 42, both disposed radially from and circumferentially about the engine centerline 102. The set of fan blades 42 and the set of fan vanes 82 extend radially outward from respective portions of the nacelle 40. As such, the set of fan blades 42 and the set of fan vanes 82 can be defined as an exterior set of fan blades and an exterior set of fan vanes 82, respectively. The turbine engine 100 includes any number of one or more sets of rotating blades or propellers (e.g., the set of fan blades 42) disposed upstream of the set of fan vanes 82. As a non-limiting example, the turbine engine 100 can include multiple sets of fan blades 42 or set of fan vanes 82. As such, the turbine engine 100 is further defined as a single-fan turbine engine. The turbine engine 100 is further defined by the location of the fan section 18 with respect to the combustion section 28. The fan section 18 can be upstream, downstream, or in-line with the axial positioning of the combustion section 28.

The compression section 104, the combustion section 28, and the turbine section 32 are collectively referred to as an engine core 44, which generates combustion gases. The engine core 44 is surrounded by an engine casing 134, which is operatively coupled with a portion of the nacelle 40 of the turbine engine 100.

An HP shaft 48 disposed coaxially about the engine centerline 102 of the turbine engine 100 drivingly connects the HP turbine 34 to the HP compressor 108. An LP shaft 50, which is disposed coaxially about the engine centerline 102 of the turbine engine 100 within the larger diameter annular HP shaft 48, drivingly connects the LP turbine 36 to the LP compressor 106 and the fan 20. The shafts 48, 50 are rotatable about the engine centerline 102 and coupled to a set of rotatable elements, which collectively define a rotor portion 120.

It will be appreciated that the turbine engine 100 is either a direct drive or integral drive engine utilizing a reduction gearbox coupling the LP shaft 50 to the fan 20.

The engine core 44 includes a working airflow path 190. The working airflow path 190 is at least partially defined by the engine casing 134, the HP shaft 48, and the LP shaft 50. Specifically, the working airflow path 190 is formed radially between the engine casing 134 and the HP shaft 48 and the LP shaft 50, with respect to the engine centerline 102.

The LP compressor 106 and the HP compressor 108 include a plurality of axially arranged stages 110. The plurality of axially arranged stages 110 include a set of LP stages 112 and a set of HP stages 114. The set of LP stages 112 are located within the LP compressor 106. The set of HP stages 114 are located within the HP compressor 108. Each stage of the plurality of axially arranged stages 110 includes a set of circumferentially spaced blades 118 (e.g., circumferentially spaced rotating blades). Each stage of the plurality of axially arranged stages 110 can include a set of circumferentially spaced vanes 116. It will be appreciated that the turbine engine 100 can be any suitable turbine engine 100 such as one that includes a vaneless counter-rotating portion. In such a configuration, at least one stage of the plurality of axially arranged stages 110 can include a set of circumferentially spaced blades 118 that are positioned axially adjacent to a set of circumferentially spaced blades 118 of an axially adjacent stage of the plurality of axially arranged stages 110. For the purposes of the description, the plurality of axially arranged stages 110 will be described as including both the set of circumferentially spaced blades 118 and the set of circumferentially spaced vanes 116.

The set of circumferentially spaced vanes 116 and the set of circumferentially spaced blades 118 extend into the working airflow path 190. In each stage of the plurality of axially arranged stages 110, the set of circumferentially spaced vanes 116 are provided upstream of and adjacent to the set of circumferentially spaced blades 118. It is noted that the number of blades, vanes, and compressor stages shown in FIG. 1 were selected for illustrative purposes only, and that other numbers are possible.

Each stage of the plurality of axially arranged stages 110 includes a rotatable disk 124. The set of circumferentially spaced blades 118 are coupled to the rotatable disk 124. The rotatable disk 124 is mounted to the corresponding one of the HP and LP shafts 48, 50. The set of circumferentially spaced vanes 116 are mounted to the engine casing 134 in a circumferential arrangement.

An interstage cavity 128 is formed between two axially adjacent rotatable disks 124. At least one stage of the plurality of axially arranged stages 110 can include a set of fins 162. The set of fins 162 extend into the respective interstage cavity 128 along any suitable portions of the axially adjacent rotatable disks 124 defining the respective interstage cavity 128. As a non-limiting example, at least one rotatable disk 124 can include a hoop stiffener 130 that extends radially inward from a respective rotatable disk 124 and into a respective interstage cavity 128. As used herein, the hoop stiffener 130 is defined as a body or structure of the turbine engine 100 that is designed to increase the rigidity of a structure that the hoop stiffener 130 is formed with or otherwise extends from (e.g., the rotatable disk 124). Specifically, the hoop stiffener 130 works by increasing a buckling resistance of a surface from which the hoop stiffener extends. The hoop stiffener 130 increases a moment of inertia of the rotatable disk 124 from where the hoop stiffener 130 extends. It will be appreciated that the rotatable disk 124 extends circumferentially about the engine centerline 102. The hoop stiffener 130 further distributes stresses circumferentially along the rotatable disk 124. The hoop stiffener 130 provides localized reinforcement to an area of the rotatable disk 124 from which the hoop stiffener 130 extends. The hoop stiffener 130 will be described in further detail below in relation to FIG. 2.

The set of fins 162 can be located along a respective portion of the hoop stiffener 130. While a single interstage cavity 128 is shown as including the hoop stiffener 130 and the set of fins 162, it will be appreciated that any stage of the plurality of axially arranged stages 110 can include a respective subset of the set of fins 162. As a non-limiting example, the set of fins 162 and the hoop stiffener 130 can be provided within an interstage cavity 128 defined by the set of HP stages 114. As a non-limiting example, the set of fins 162 and the hoop stiffener 130 can be provided within an interstage cavity 128 provided in a final or axially farthest downstream stage of the set of HP stages 114.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage of the set of turbine stages 64, 66, multiple turbine blades 68, 70 are provided in a ring. The multiple turbine blades 68, 70 extend radially outwardly relative to the engine centerline 102, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP shafts 48, 50, with each stage having a dedicated disk 71. The static turbine vanes 72, 74 for the turbine stages 64, 66 of the turbine section 32 are mounted to the engine casing 134 in a circumferential arrangement.

Rotary portions of the turbine engine 100, such as the set of circumferentially spaced blades 118, and the turbine blades 68, 70 among the compression section 104 and the turbine section 32 are also referred to individually or collectively as the rotor portion 120. As such, the rotor portion 120 refers to the combination of rotating elements throughout the turbine engine 100.

Complementary to the rotary portions, the stationary portions of the turbine engine 100, such as the set of circumferentially spaced vanes 116, and static turbine vanes 72, 74 among the compression section 104 and the turbine section 32 are also referred to individually or collectively as a stator portion 122. As such, the stator portion 122 refers to the combination of non-rotating elements throughout the turbine engine 100.

The nacelle 40 is operatively coupled to the turbine engine 100 and covers at least a portion of the engine core 44, the engine casing 134, or the exhaust section 38. At least a portion of the nacelle 40 extends axially forward or upstream of the illustrated position. For example, the nacelle 40 extends axially forward such that a portion of the nacelle 40 overlays or covers a portion of the fan section 18 or a booster section (not illustrated) of the turbine engine 100. The turbine engine 100 includes a pylon 84. The pylon 84 mounts the turbine engine 100 to an exterior structure (e.g., a fuselage of an aircraft, a wing, a tail wing, etc.).

The turbine engine 100 includes an inducer 31. The inducer 31 fluidly couples the compressor section 104 to the combustion section 28. Specifically, the inducer 31 fluidly couples the HP compressor 108 to the combustion section 28. The inducer 31 is defined as a body within the turbine engine 100 that is used to inject air from the compressor section 104 into the combustion section 28. It is contemplated that the inducer 31 can be used to accelerate the air from the compressor section 104 prior to the air entering the combustion section 28.

During operation of the turbine engine 100, a freestream airflow 80 flows against a forward portion of the turbine engine 100. A first portion of the freestream airflow 80 flows along the nacelle 40 and over the set of stationary fan vanes 82 as an exterior airflow 78. The exterior airflow 78 flows past the set of stationary fan vanes 82, following the curvature of the nacelle 40 and toward the exhaust section 38. A second portion of the freestream airflow 80 enters an annular area 25 defined by a swept area between an outer surface of the nacelle 40 and the tip of the fan blade 42, with this air flow being a working airflow 196 flowing through the working airflow path 190. A portion of the working airflow 196 enters the engine core 44 and is used for combustion within the engine core 44.

More specifically, the working airflow 196 flows into the LP compressor 106, which then pressurizes the working airflow 196 thus defining a pressurized airflow that is supplied to the HP compressor 108, which further pressurizes the air. The working airflow 196, or the pressurized airflow, from the HP compressor 108 is mixed with fuel in the combustor 30 and ignited, thereby generating combustion gases. Some work is extracted from these gases by the HP turbine 34, which drives the HP compressor 108. The combustion gases are discharged into the LP turbine 36, which extracts additional work to drive the LP compressor 106, and the working airflow 196, or exhaust gas, is ultimately discharged from the turbine engine 100 via the exhaust section 38. The driving of the LP turbine 36 drives the LP shaft 50 to rotate the fan 20 and the LP compressor 106. The working airflow 196, including the pressurized airflow and the combustion gases, defines a working airflow that flows through the compression section 104, the combustion section 28, and the turbine section 32 of the turbine engine 100.

The working airflow 196 and at least some of the exterior airflow 78 merge downstream of the exhaust section 38 of the turbine engine 100. The working airflow 196 and the exterior airflow 78, together, form an overall thrust of the turbine engine 100.

It is contemplated that a portion of the working airflow 196 is drawn as bleed air 132 from a portion of the turbine engine 100 upstream of the interstage cavity 128. As a non-limiting example, the bleed air 132 can be drawn from the fan section 18 (FIG. 1), the LP compressor 106 (FIG. 1) or an upstream section of the HP compressor 108. The bleed air 132 provides an airflow to engine components for cooling. The temperature of the working airflow 196 exiting the combustor 30 is significantly increased with respect to the working airflow 196 within the compression section 104. As such, cooling provided by the bleed air 132 can be used for operating of such engine components in the heightened temperature environments or a hot portion of the turbine engine 100. In the context of a turbine engine, the hot portions of the engine are normally downstream of the combustor 30, especially the turbine section 32, with the HP turbine 34 being the hottest portion as it is directly downstream of the combustion section 28. Sources of cooling fluid include, but are not limited to, fluid discharged from the LP compressor 106 or the HP compressor 108.

Figure 2:
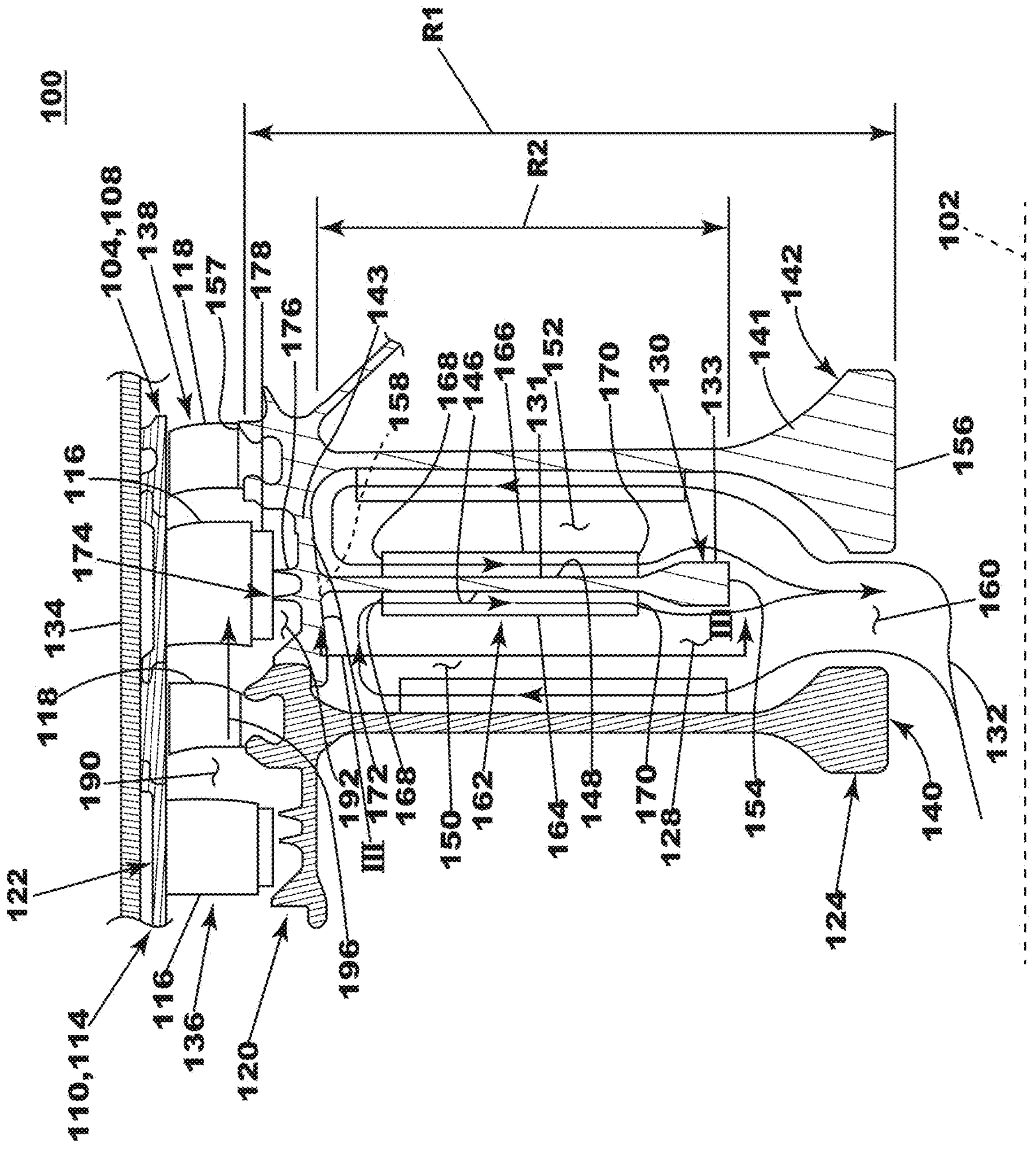
FIG. 2 is a schematic illustration of the turbine engine as seen from area II of FIG. 1, further illustrating a rotatable disk, an interstage cavity, a hoop stiffener, and a set of fins in accordance with various aspects described herein.

FIG. 2 is a schematic illustration of the turbine engine 100 as seen from area II of FIG. 1. The plurality of axially arranged stages 110 within the HP compressor 108 include a first HP stage 136 and a second HP stage 138. The second HP stage 138 is downstream of and axially adjacent to the first HP stage 136. The second HP stage 138 is an axially last stage (e.g., farthest aft) of the plurality of axially arranged stages 110. Put another way, the combustion section 28 of FIG. 1 is provided directly downstream of the second HP stage 138. The first HP stage 136 is a second to last stage of the plurality of axially arranged stages 110.

While illustrated as the second to last and last stages, it will be appreciated that the first HP stage 136 and the second HP stage 138 can be any stage of the plurality of axially arranged stages 110. While the set of fins 162 are shown to be in the interstage cavity 128 that is formed by the last and second to last stages of the plurality of axially arranged stages 110, it will be appreciated that at least the last two stages of the plurality of axially arranged stages 110 within the compression section 104 can include a respective interstage cavity having the set of fins 162.

The first HP stage 136 includes a first rotatable disk 140. The second HP stage 138 includes a second rotatable disk 142. The first rotatable disk 140 and the second rotatable disk 142 are two examples of the rotatable disk 124 described in FIG. 1. The interstage cavity 128 is defined such that a perimeter of the cavity includes various surrounding portions of the turbine engine 10. Specifically, the interstage cavity 128 is bounded axially by the first rotatable disk 140 and the second rotatable disk 142. A radially outer portion of the interstage cavity 128 is bounded by the first rotatable disk 140, the second rotatable disk 142, or a combination thereof. Specifically, at least a portion of an inner hoop surface 172 of the second rotatable disk 140 radially bounds the interstage cavity 128.

The second rotatable disk 142 includes a main body 141 and an arm 143 extending axially forward of the main body 141. The main body 141 terminates radially at a disk proximal end 156. The disk proximal end 156 is defined as a radially farthest portion of the second rotatable disk 142 from the working airflow path 190. The main body 141 terminates at a disk distal end 157 defined as the radially farthest portion of the second rotatable disk 142 from the disk proximal end 156. The main body 141 extends a first radial distance (R1) between the disk proximal end 156 and the disk distal end 157, with respect to the engine centerline 102.

The second rotatable disk 142 includes the inner hoop surface 172. Specifically, the arm 143 includes the inner hoop surface 172. The inner hoop surface 172 is a surface defining a radially outer portion of the interstage cavity 128. The hoop stiffener 130 extends radially inwardly from the inner hoop surface 172 and to a stiffener proximal end 154. The hoop stiffener 130 meets with a remainder of arm 143 at a transition 158, shown in phantom lines. The hoop stiffener 130 extends a second radial distance (R2) from the transition 158 and to the stiffener proximal end 154, with respect to the engine centerline 102. The stiffener proximal end 154 is provided within the interstage cavity 128. The first radial distance (R1) is larger than the second radial distance (R2).

The hoop stiffener 130 is formed as a wall within the interstage cavity 128. The hoop stiffener 130 includes a forward surface 146 and an aft surface 148. The forward surface 146 is an axially forward surface with respect to the engine centerline 102. The aft surface 148 is an axially aft surface with respect to the engine centerline 102. The hoop stiffener 130 is positioned to divide the interstage cavity 128 into a first cavity 150 (e.g., a forward cavity) and a second cavity 152 (e.g., an aft cavity). The first cavity 150 is formed axially between the first rotatable disk 140 and the forward surface 146. The second cavity 152 is formed axially between the aft surface 148 and an axially opposing portion of the second rotatable disk 142, specifically the main body 141. The first cavity 150 and the second cavity 152 extend radially between the inner hoop surface 172 and the stiffener proximal end 154, with respect to the engine centerline 102.

The hoop stiffener 130 can extend continuously about an entirety of a circumferential extent of the engine centerline 102. As such, the hoop stiffener 130 can form an annular ring (e.g., a continuous annular ring) within the interstage cavity 128. The hoop stiffener 130 can be segmented or otherwise extend about less than the entirety of the circumferential extent of the engine centerline 102.

The hoop stiffener 130 is defined as a radially elongated portion of the second rotatable disk 142, with respect to the engine centerline 102. Specifically, the hoop stiffener 130 is defined as a radially elongated portion of the second rotatable disk 142 that extends from the arm 143. Specifically, the hoop stiffener 130 extends radially inward from the inner hoop surface 172, with respect to the engine centerline 102. As the hoop stiffener 130 extends from the arm 143, the hoop stiffener 130 increases the buckling resistance of the arm 143 in relation to a scenario where the second rotatable disk 142 is formed without the hoop stiffener 130. Put another way, the hoop stiffener 130 increases a rigidity of the arm 143 in relation to a scenario where the second rotatable disk 142 is formed without the hoop stiffener 130. The hoop stiffener 130 is located axially between the first rotatable disk 140 and the main body 141 of the second rotatable disk 142. The hoop stiffener 130 can be imperforate. Alternatively, the hoop stiffener 130 can include cavities or cutouts within the hoop stiffener 130. The hoop stiffener 130 can be integrally formed with the arm 143. Alternatively, the hoop stiffener 130 can be coupled to the arm 143 through any suitable coupling method such as, but not limited to, welding, adhesion, fastening, bonding, or the like. The hoop stiffener 130 can include one or more similar materials as the arm 143 and the hoop stiffener 130. Alternatively, the hoop stiffener 130 and the arm 143 can include differing materials.

The hoop stiffener 130 can have various shapes. As a non-limiting example, the hoop stiffener 130 can include a stem 131 and a foot 133. The stem 131 extend radially from the arm 143, specifically the inner hoop surface 172, with respect to the engine centerline 102. The foot 133 is located along a radially innermost end of the stem 131, with respect to the engine centerline 102. The foot 133 has an axial thickness that is larger than an axial thickness of the stem 131, with respect to the engine centerline 102. Put another way, the foot 133 flares axially outward (e.g., axially in at least one of a forward direction, an aft direction, or a combination thereof) from the stem 131.

The use of the hoop stiffener 130 having the stem 131 and the foot 133 decreases an inertia of the hoop stiffener 130 in comparison to scenario where an exemplary hoop stiffener having a same mass as the hoop stiffener 130 but being formed by a constant axial thickness (e.g., entirely radially as the stem 131). Forming the hoop stiffener 130 to have the stem 131 and the foot moves the center of mass radially towards the engine centerline 102 in comparison to the exemplary hoop stiffener having the same mass as the hoop stiffener 130. Moving the center of mass radially nearer to the engine centerline 102 reduces the inertia of the hoop stiffener 130 in comparison to the exemplary hoop stiffener. The hoop stiffener 130 is coupled to or otherwise formed with the arm 143. If the overall inertia of the arm 143 including the hoop stiffener 130 is calculated, the inertia of the arm 143 is lower when the hoop stiffener 130 is included in comparison to if the second rotatable disk 142 is formed without the hoop stiffener 130. Specifically, use of the hoop stiffener 130 moves a center of mass of a combination of the arm 143 and the hoop stiffener 130 radially closer to the engine centerline 102 than if the second rotatable disk 142 did not include the hoop stiffener 130. Further, forming the hoop stiffener 130 to include the foot 133 further moves the center of mass of the combination of the arm 143 and the hoop stiffener 130 radially closer to the engine center 102 in comparison to a scenario where the hoop stiffener 130 is formed without the foot 133 (e.g., as the exemplary hoop stiffener described previously). The reduction of the inertia of the arm 143 (e.g., through use of the hoop stiffener 130), reduces the stresses (e.g., the buckling stresses) experienced along the arm 143 during rotation of the second rotatable disk 142.

Each fin of the set of fins 162 can extend radially between a leading edge 168 and a trailing edge 170. The leading edge 168 is defined as a portion of the respective fin that first contacts a flow of fluid in the interstage cavity 128 when the flow of fluid contacts the respective fin. Put another way, the leading edge 168 is defined as an upstream portion of the respective fin. The trailing edge 170 is defined as a downstream portion of the respective fin. The set of fins 162 are arranged such that the leading edge 168 is provided radially outward from the trailing edge 170, with respect to the engine centerline 102.

The set of fins 162 can include various numbers of groups of fins that are circumferentially spaced with respect to one another. As a non-limiting example, the set of fins 162 can include a first group of fins 164 and a second group of fins 166. The first group of fins 164 extend axially from the forward surface 146 and into the first cavity 150. The second group of fins 166 extend axially from the aft surface 148 and into the second cavity 152.

The turbine engine 100 includes a cooling airflow circuit 160. The cooling airflow circuit 160 is fluidly coupled to the interstage cavity 128. The cooling airflow circuit 160 is fluidly coupled to a portion of the set of LP stages 112 (FIG. 1). The cooling airflow circuit 160 extends from at least one LP stage of the set of LP stages 112 and to the interstage cavity 128. The cooling airflow circuit 160 can be formed as an open area within the turbine engine 100, a duct, a tube, a channel, or a combination thereof.

The turbine engine 100 includes a leakage cavity 192. The leakage cavity 192 is defined as a space radially between the set of circumferentially spaced vanes 116 and the rotatable disk 124 (e.g., the first rotatable disk 140 and the second rotatable disk 142). The leakage cavity 192 is fluidly coupled to the working airflow path 190.

The turbine engine 100 includes an interstage seal 174. The interstage seal 174 is provided within the leakage cavity 192. The interstage seal 174 is defined as a seal configured to limit or otherwise stop a flow of fluid from the working airflow path 190 from flowing radially between the set of circumferentially spaced vanes 116 and a respective rotatable disk 124. As illustrated, a single interstage seal 174 is numbered between the set of circumferentially spaced vanes 116 and the second rotatable disk 142. The interstage seal 174 is formed along a respective portion of the arm 143. As a non-limiting example, the interstage seal 174 can include a plurality of fingers 176 extending radially from the second rotatable disk 142, and a wear element 178. The wear element 178 can include, for example, a honeycomb seal.

The hoop stiffener 130 can extend from various portions of the second rotatable disk 142 along the inner hoop surface 172. As a non-limiting example, the hoop stiffener 130 can be axially aligned with a respective portion of the set of circumferentially spaced vanes 116. As a non-limiting example, the hoop stiffener 130 can be axially aligned with a respective portion of the interstage seal 174.

During operation, the working airflow 196 flows through the working airflow path 190 and over respective portions of the set of circumferentially spaced vanes 116 and the set of circumferentially spaced blades 118. The flowing of the working airflow 196 over the set of circumferentially spaced vanes 116 and the set of circumferentially spaced blades 118 pressurizes the working airflow 196. As such, a pressure of the working airflow 196 increases with each subsequent stage of the plurality of axially arranged stages 110. The increase in pressure, in turn, increases the temperature of the working airflow 196. In some cases, the temperature of the working airflow 196 within the compression section 104 can be up to or exceed 1000° F. The heat from the working airflow 196 can be transferred to various portions of the turbine engine 100 such as, but not limited to, portions of the first rotatable disk 140 and the second rotatable disk 142 confronting the working airflow path 190.

At least a portion of the working airflow 196 flows into the leakage cavity 192. As such, the working airflow 196 transfers heat to components of the turbine engine 100 confronting the leakage cavity 192, such as the rotatable disk 124.

The interstage cavity 128 is at least locally fluidly isolated from the working airflow 196 that flows through an axially aligned stage of the plurality of axially arranged stages 110. For example, the interstage cavity 128 is locally isolated from the working airflow 196 that flows through the second HP stage 138.

The transfer of the heat from the working airflow 196 to the rotatable disk 124 (e.g., the first rotatable disk 140, the second rotatable disk 142, or a combination thereof) can cause thermal deformation of the rotatable disk 124 if the rotatable disk 124 is overly heated. The thermal deformation, over time, can cause thermal fatigue which can result in the failure of or otherwise the degradation of the engine components (e.g., the rotatable disk 124) that are overly heated by the working airflow 196.

The later stages of the compression section 104 (e.g., the second HP stage 138) will be exposed to the hottest working airflow 196 within the compression section 104. Once the working airflow 196 exceeds a threshold temperature, the transfer of heat from the working airflow 196 to respective portions of the stage can cause thermal fatigue. To ensure that the rotatable disk 124, specifically, the second rotatable disk 142, is not overly heated, a flow of bleed air 132 is fed to the interstage cavity 128 via the cooling airflow circuit 160.

The flow of bleed air 132 flows radially towards the working airflow path 190 (e.g., radially outward) and along a respective portion of the inner hoop surface 172 within the first cavity 150 and the second cavity 152. The contacting of the flow of bleed air 132 and the inner hoop surface 172, in turn, cools the portions of the second rotatable disk 142 that come into contact with the working airflow 196. The contacting of the flow of bleed air 132 and the second rotatable disk 142, in turn, reduces the thermal expansion of second rotatable disk 142. Therefore, the contacting of the flow of bleed air 132 reduces the thermal fatigue of the second rotatable disk 142 in relation to a turbine engine that does not include the interstage cavity 128 described herein.

The flow of bleed air 132 then flows over the set of fins 162 from the leading edge 168 and to the trailing edge 170 (e.g., radially inward). The flow of bleed air 132 is then fed back into the cooling airflow circuit 160 from where it was fed into the interstage cavity 128. The flow of bleed air 132 can then be used at downstream portions of the turbine engine 100 or otherwise be reintroduced to the working airflow path 190.

The reintroduction of the flow of bleed air 132 to the cooling airflow circuit 160, however, can result in efficiency losses by creating a drag against the rotatable disk 124. The drag against the rotatable disk 124 is referred to as windage losses. To counter this windage losses, the set of fins 162 are provided to extract a work from the flow of bleed air 132 and to direct the flow of bleed air 132 such that the flow of bleed air 132 includes a circumferential component that is in the same direction as a circumferential rotation of the rotatable disk 124. The architecture of the set of fins 162 that allows for the extraction of work from and the redirection of the flow of bleed air 132 will be described in further detail below.

As the set of fins 162 cool the second rotatable disk 142, the compression section 104 can include additional stages in comparison to a turbine engine that does not include the set of fins 162. Specifically, the compression section 104 can include additional stages as the compression section 104 includes architecture (e.g., the set of fins 162) that cool the downstream portions of the compression section 104 that will come into contact with the hottest portions of the working airflow 196. The additional stages, in turn, increases the pressure and temperature of the working airflow 196 that is fed to the combustion section 28 (FIG. 2). The higher temperature and pressure of the working airflow 196 that flows into the combustion section 28 can increase the efficiency of the combustion section 28, which increases the overall efficiency of the turbine engine 100.

It will be appreciated that each additional stage within the compression section 104 further increases the pressure of the working airflow 196. Put another way, the more stages within the compressor section 104, the higher the pressure of the working airflow 196 that exits the compressor section 104 and flows into the combustion section 28 (FIG. 1). As discussed herein, the set of fins 162 enable the use of the compressor section 104 with additional stages. Due to the increased pressure, the turbine engine 100, as described herein, has a relatively high OPR compared to a conventional turbine engine. The conventional turbine engine has an OPR of less than or equal to fifty. The OPR of the turbine engine 100, as described herein, is greater than fifty-four and less than or equal to 75. The benefit of having the turbine engine 100 with a relatively high OPR is that the working airflow 196 that is fed to the combustion section 28 or other downstream portions of the turbine engine 100 has a higher pressure, which facilitates an efficient combustion within the combustion section 28. Further, the higher pressure that the working airflow 196 is, the higher the pressure of the combustion gases exiting the combustion chamber 28 and entering the turbine section 32. It is contemplated that higher pressure combustion gases result in a more efficient driving of the turbine section 32, which in turn results in a more efficient driving of the fan section 18, the compressor section 104, or a combination thereof.

The use of the hoop stiffener 130 decreases the hoop stresses associated with the rotation of the rotatable disk 124. Put another way, the hoop stiffener 130 acts as a body that stiffens the rotatable disk 124 such that hoop stresses associated with the rotation of the rotatable disk 124 do not damage or cause less damage to the rotatable disk 124. It is contemplated that interstage seal 174, specifically the set of fingers 176, is the portion of the second rotatable disk 142 that degrades the fastest. This degradation of the set of fingers 176 is a result of the arm 143 of the second rotatable disk moving radially, with respect to the engine centerline 102, causing the set of fingers 176 to move towards and in some cases contact the wear element 178. Positioning the hoop stiffener 130 along the arm 143 to be axially aligned with the interstage seal 174 stiffens the arm 143, thereby reducing the movement of the arm 143 in comparison to a rotatable disk formed without the hoop stiffener 130. The reduction of the movement of the arm 143 reduces the wear on the set of fingers 176; therefore, increasing the overall lifespan of the second rotatable disk 142 in comparison with the rotatable disk formed without the hoop stiffener 130.

It will be appreciated that the use of the cooling air circuit 160 to cool the second rotatable disk 142 can be used in tandem with other cooling structures of the turbine engine 100. As a non-limiting example, the turbine engine 100 can include the inducer 31 (FIG. 1) that fluidly couples the HP compressor 108 to the combustion section 28 (FIG. 1). The turbine engine 100 can include a fluid circuit (not illustrated) that feeds air from the inducer 31 to a receptive portion of the second rotatable disk 142. Put another way, the air from the inducer 31 can impinge a respective portion of the second rotatable disk 142 to provide additional cooling of the second rotatable disk 142 beyond the cooling air circuit 160.

Figure 3:
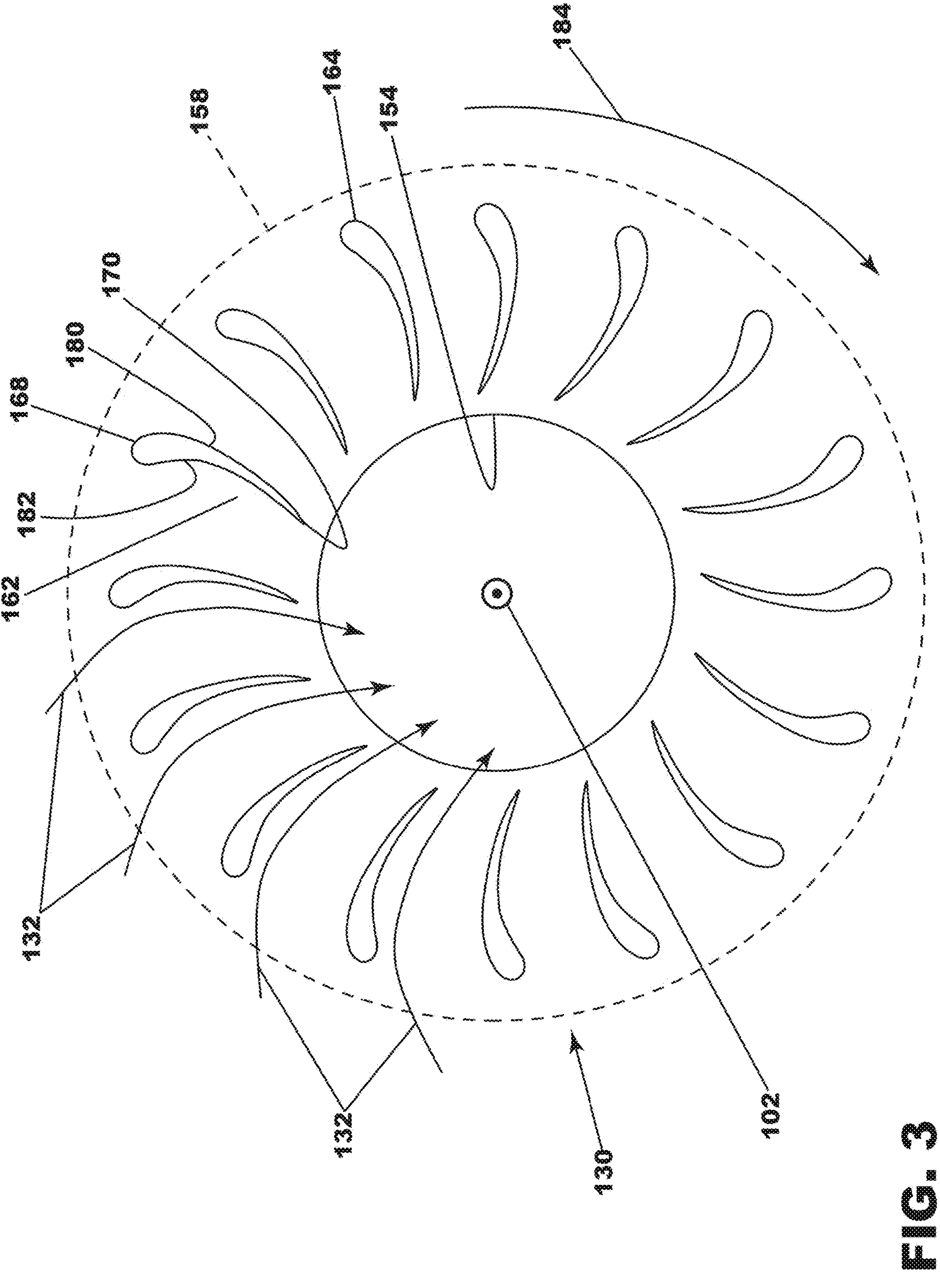
FIG. 3 is a schematic illustration of the set of fins as seen from sight line III-III of FIG. 2, further illustrating the set of fins having an airfoil cross section in accordance with various aspects described herein.

FIG. 3 is a schematic illustration of the set of fins 162 as seen from sight line III-III of FIG. 2. The hoop stiffener 130, as illustrated, is removed from a remainder of the second rotatable disk 142 for illustrative purposes. It will be appreciated that while described in terms of the first group of fins 164, the aspects described herein are applicable to any group of fins of the set of fins 162. Each fin of the set of fins 162 can be formed with an airfoil cross section. Put another way, each fin of the set of fins 162 can include a suction side 180 and an opposing pressure side 182.

During operation, the rotatable disk 124, and therefore the set of fins 162, rotate in a circumferential direction 184 with respect to the engine centerline 102. The flow of bleed air 132 follows the contour of the set of fins 162 by flowing against the pressure side 182. The set of fins 162, as illustrated, redirect the flow of bleed air 132 to reduce the efficiency losses associated with the use of the flow of bleed air 132 as described herein. It is contemplated that the set of fins 162 extract a work from the flow of bleed air 132. Specifically, the set of fins 162 are oriented such that the flowing of the flow of bleed air 132 against the set of fins 162 pushes the rotatable disk 124 in the circumferential direction 184. The pushing of the rotatable disk 124 in the circumferential direction 184, via the flow of bleed air 132, adds to the overall efficiency of the turbine engine 100. Put another way, the flow of bleed air 132 is used for cooling, and the set of fins 162 extract a work from the flow of bleed air 132. It will be appreciated that the set of fins 162 are designed to impart a circulation to the flow of fluid (e.g., the flow of bleed air 132) within the interstage cavity 128.

Figure 4:
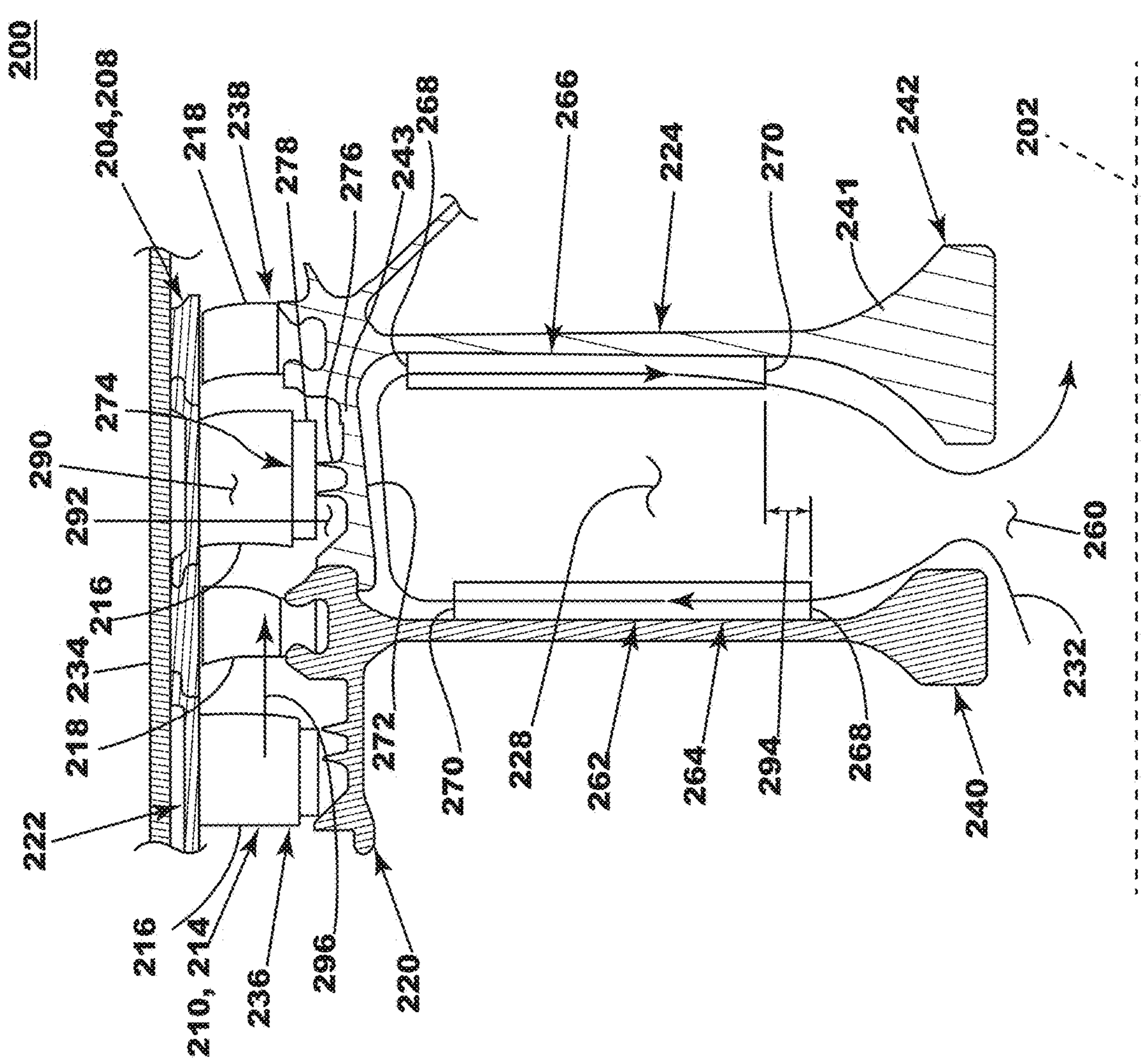
FIG. 4 is a schematic illustration of a portion of an exemplary turbine engine suitable for use as the turbine engine of FIG. 1, further comprising a rotatable disk, an interstage cavity, and a set of fins in accordance with various aspects described herein.

FIG. 4 is a schematic illustration of a portion of a turbine engine 200 suitable for use as the turbine engine 100 of FIG. 1. The turbine engine 200 is similar to the turbine engine 100; therefore, like parts will be identified with like numerals increased to the 200 series with it being understood that the description of the turbine engine 100 applies to the turbine engine 200 unless noted otherwise.

The turbine engine 200 includes an engine casing 234, a compression section 204, an engine centerline 202, a rotor portion 220 and a stator portion 222. The compression section 204 can include an LP compressor (e.g., the LP compressor 106 of FIG. 1) and an HP compressor 208. The compression section 204 includes a working airflow path 290 and a leakage cavity 292. An interstage seal 274 is provided within the leakage cavity 292. The interstage seal 274 can include a plurality of fingers 276 and a wear element 278. The compression section 204 includes a plurality of axially arranged stages 210. Each stage of the plurality of axially arranged stages 210 includes a rotatable disk 224, a set of circumferentially spaced vanes 216, and a set of circumferentially spaced blades 218. The plurality of axially arranged stages 210 includes a set of HP stages 214. The set of HP stages 214 includes a first HP stage 236 and a second HP stage 238. The first HP stage 236 includes a first rotatable disk 240. The second HP stage 238 includes a second rotatable disk 242. The second rotatable disk 242 includes a main body 241 and an arm 243. An interstage cavity 228 is formed between opposing portions of the first rotatable disk 240 and the second rotatable disk 242. The second rotatable disk 242 includes an inner hoop surface 272 confronting the interstage cavity 228. The turbine engine 200 includes a cooling air circuit 260 that extends from a set of LP stages (e.g., the set of LP stages 112 of FIG. 1) and the interstage cavity 228. A set of fins 262 extend into the interstage cavity 228. Each fin of the set of fins 262 includes a leading edge 268 and a trailing edge 270. The second HP stage 238 can be a last or second to last stage of the plurality of axially arranged stages 210. The set of fins 262 can be located within the interstage cavity 228 of the last stage, second to last stage, or a combination thereof.

The set of fins 262, like the set of fins 162 (FIG. 2), can include a first group of fins 264 and a second group of fins 266. The first group of fins 262 extends axially from an aft face of the first rotatable disk 240. The second group of fins 264 extends axially from a forward face of the second rotatable disk 242. As such, the first group of fins 264 is provided along an axially opposing side of the interstage cavity 228 from the second group of fins 266. While the set of fins 262 are shown to include both the first group of fins 264 and the second group of fins 266, it will be appreciated that the set of fins 262 can include only one of the first group of fins 264 or the second group of fins 266.

The first group of fins 264 can be radially offset (e.g., partially radially offset) from the second group of fins 266. Put another way, an offset 294 can be formed between a radially innermost portion or a radially outermost portion of the first group of fins 264, and a radially innermost portion or a radially outermost portion of the second group of fins 266, respectively. The offset 294 is various sizes. As a non-limiting example, the offset 294 can be zero. As illustrated, the offset 294 between both the radially innermost portion and the radially outermost portion of the first group of fins 264 and the second group of fins 266 is non-zero.

During operation, a working airflow 296 flows through the working airflow path 290 and the leakage cavity 292. The interstage cavity 228 is fluidly isolated from the working airflow 296 in the second HP stage 238.

A flow of bleed air 232 is fed to the interstage cavity 228 and directed against the inner hoop surface 272. The set of fins 262 are oriented such that the flow of bleed air 232 first flows over the first group of fins 264, along the inner hoop surface 272, and then against the second group of fins 266. As such, the first group of fins 264 are radially opposite the second group of fins 266. Put another way, the leading edge 268 of the first group of fins 264 is radially closer to the trailing edge 270 of the second group of fins 266 than the leading edge 268 of the second group of fins 266. Put another way, the leading edge 268, the trailing edge 270, or both, of the first group of fins 264 can be radially spaced from the engine centerline 202 a different distance than the trailing edge 270 and leading edge 268, respectively, of the second group of fins 266.

In comparison with the turbine engine 100 (FIG. 2), the HP compressor 208 is lighter than the HP compressor 108 (FIG. 2). This is due to a lack of a hoop stiffener (e.g., the hoop stiffener 130 depicted in FIG. 2). It is contemplated that in some turbine engines (e.g., the turbine engine 200), the hoop stiffener 130 is not required to strengthen the inner hoop surface 272.

With reference to FIGS. 1-4, it will be appreciated that a turbine engine formed as a combination of features from the turbine engine 100 of FIG. 1 and features from the turbine engine 200 of FIG. 4 is possible. For example, the turbine engine 100, 200 can include hoop stiffener 130 and a set of fins 162, 262 provided along at least one of the first rotatable disk 140, 240, the second rotatable disk 142, 242, the forward surface 146 of the hoop stiffener 130, the aft surface 148 of the hoop stiffener 130, or a combination thereof.

Figure 5:
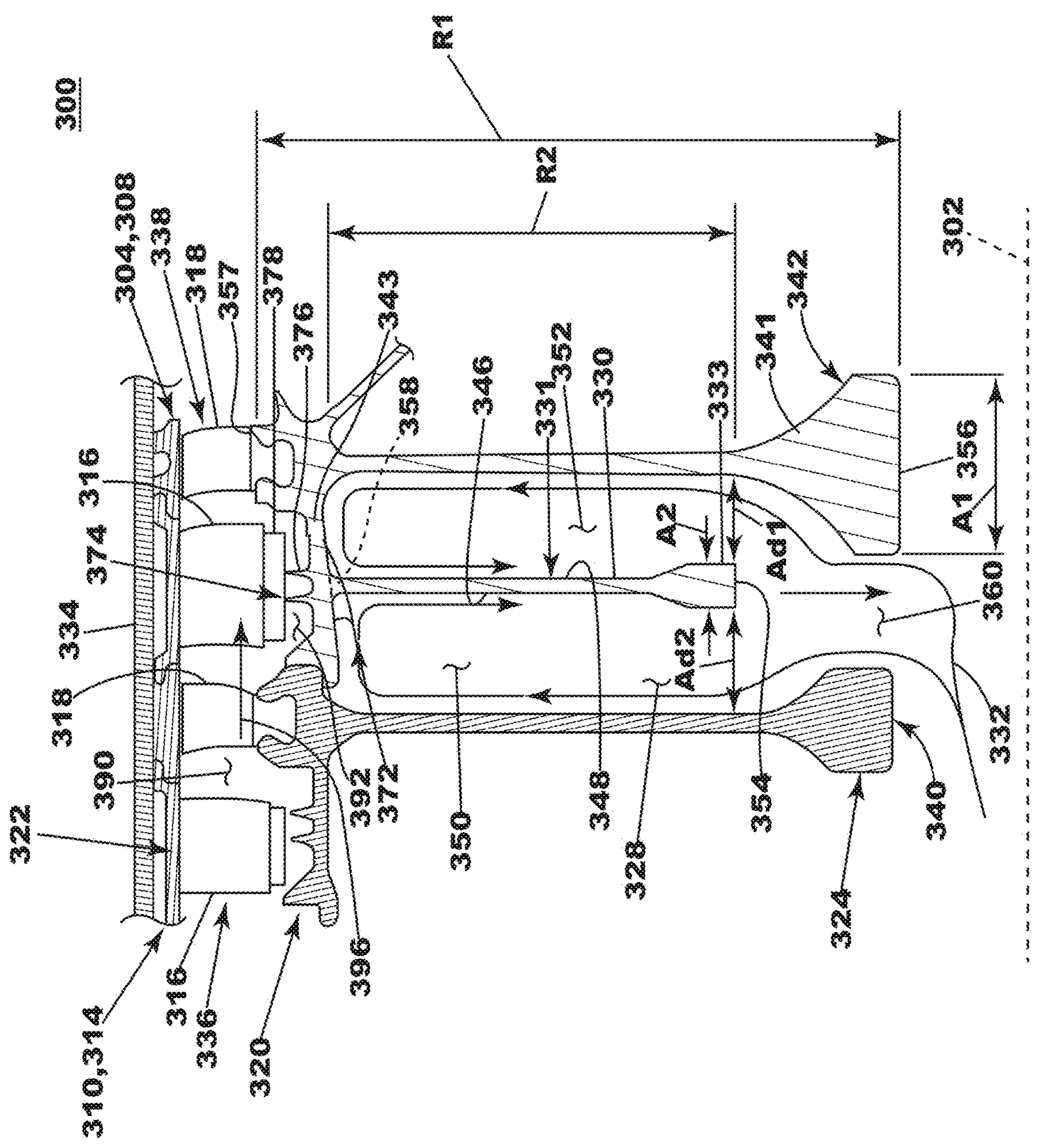
FIG. 5 is a schematic illustration of a portion of an exemplary turbine engine suitable for use as the turbine engine of FIG. 1, further comprising a rotatable disk, an interstage cavity, and a hoop stiffener in accordance with various aspects described herein.

FIG. 5 is a schematic illustration of a portion of a turbine engine 300 suitable for use as the turbine engine 100 of FIG. 1. The turbine engine 300 is similar to the turbine engine 100, 200 (FIG. 4); therefore, like parts will be identified with like numerals increased to the 300 series with it being understood that the description of the turbine engine 100, 200 applies to the turbine engine 300 unless noted otherwise.

The turbine engine 300 includes an engine casing 334, a compression section 304, an engine centerline 302, a rotor portion 320 and a stator portion 322. The compression section 304 can include an LP compressor (e.g., the LP compressor 106 of FIG. 1) and an HP compressor 308. The compression section 304 includes a working airflow path 390 and a leakage cavity 392. An interstage seal 374 is provided within the leakage cavity 392. The interstage seal 374 can include a plurality of fingers 376 and a wear element 378. The compression section 304 includes a plurality of axially arranged stages 310. Each stage of the plurality of axially arranged stages 310 includes a rotatable disk 324, a set of circumferentially spaced vanes 316, and a set of circumferentially spaced blades 318. The plurality of axially arranged stages 310 includes a set of HP stages 314. The set of HP stages 314 includes a first HP stage 336 and a second HP stage 338. The first HP stage 336 includes a first rotatable disk 340. The second HP stage 338 includes a second rotatable disk 342. The second rotatable disk 342 includes a main body 341 and an arm 343. An interstage cavity 328 is formed between opposing portions of the first rotatable disk 340 and the second rotatable disk 342. The second rotatable disk 342 includes an inner hoop surface 372 confronting the interstage cavity 328. The turbine engine 300 includes a cooling air circuit 360 that extends from a set of LP stages (e.g., the set of LP stages 112 of FIG. 1) and the interstage cavity 328. The second HP stage 338 can be a last or second to last stage of the plurality of axially arranged stages 310.

The second rotatable disk 342 terminates radially at a disk proximal end 356. The disk proximal end 356 is defined as a radially farthest portion of the second rotatable disk 342 from the working airflow path 390. The second rotatable disk 342 terminates at a disk distal end 357 defined as the radially farthest portion of the second rotatable disk 342 from the disk proximal end 356. The second rotatable disk 342 extends a first radial distance (R1) between the disk proximal end 356 and the disk distal end 357, with respect to the engine centerline 302

The turbine engine 300, like the turbine engine 100, includes a hoop stiffener 330. The difference, however, is that the turbine engine 300 is formed without a set of fins (e.g., the set of fins 162 depicted in FIG. 2).

The hoop stiffener 330 is formed as a wall within the interstage cavity 328. The hoop stiffener 330 includes a forward surface 346 and an aft surface 348. The hoop stiffener 330 can include a stem 331 and a foot 333. The hoop stiffener 330 splits the interstage cavity 328 into a first cavity 350 (e.g., a forward cavity) and a second cavity 352 (e.g., an aft cavity). The first cavity 350 is formed axially between the first rotatable disk 340 and the forward surface 346. The second cavity 352 is formed axially between the aft surface 348 and an axially opposing portion of the second rotatable disk 342. The first cavity 350 and the second cavity 352 extend radially between the inner hoop surface 372 and the stiffener proximal end 354, with respect to the engine centerline 302.

The hoop stiffener 330 extends a second radial distance (R2) from the transition 358 and to the stiffener proximal end 354, with respect to the engine centerline 302. The stiffener proximal end 354 is provided within the interstage cavity 328. The first radial distance (R1) is larger than the second radial distance (R2). The second radial distance (R2) is greater than or equal to 10% and less than or equal to 90% of the first radial distance (R1). The relationship between the first radial distance (R1) and the second radial distance (R2) allows for the hoop stiffener 330 to strengthen the second rotatable disk 342, which will be described in further detail below.

The second rotatable disk 342 has a first axial thickness (A1) at or near the disk proximal end 356, with respect to the engine centerline 302. The hoop stiffener 330 has a second axial thickness (A2) at or near the stiffener proximal end 354, with respect to the engine centerline 302. As used herein, the term "near" refers to within a radial zone within a region that is 90% and 100% of the first radial length (R1) and the second radial length (R2), with 100% of the first radial length (R1) and the second radial length (R2) corresponding to the disk proximal end 356 and the stiffener proximal end 354, respectively. The first axial thickness (A1) is larger than the second axial thickness (A2). The second axial thickness (A2) is greater than or equal to 10% and less than or equal to 90% of the first axial thickness (A1). The relationship between the first axial thickness (A1) and the axial thickness (A2) allows for the hoop stiffener 330 to strengthen the second rotatable disk 342, which will be described in further detail below.

It will be appreciated that the first axial thickness (A1) and the second axial thickness (A2) defines a maximum thickness of the main body 341 and the hoop stiffener 330, respectively. At least a portion of the hoop stiffener 330 (e.g., a portion of the hoop stiffener 330 radially between the radial zone and the transition 358) has an axial thickness that is less than the second axial thickness (A2). The positioning of the second axial thickness (A2) at or near the stiffener proximal end 354 allows for the hoop stiffener 330 to strengthen the second rotatable disk 342, which will be described in further detail below.

The hoop stiffener 330 is spaced from axially opposing portions of the first rotatable disk 340 and the second rotatable disk 342. Specifically, the hoop stiffener 330 where the forward surface 346 meets the stiffener proximal end 354 is positioned a first axial distance (Ad1) from an axially opposing portion of the first rotatable disk 340, with respect to the engine centerline 302. The hoop stiffener 330 where the aft surface 348 meets the stiffener proximal end 354 is positioned a second axial distance (Ad2) from an axially opposing portion of the second rotatable disk 342, specifically the main body 341, with respect to the engine centerline 302. The first axial distance (Ad1) is greater than, equal to or less than the second axial distance (Ad2). The positioning of the hoop stiffener 330 with respect to the first rotatable disk 340 and the second rotatable disk 342 through the first axial distance (Ad1) and the second axial distance (Ad2), respectively, ensures that the hoop stiffener 330 is strengthening the portion of the second rotatable disk 342 defined by the inner hoop surface 372. While the first rotatable disk 340 is illustrated as axially forward of the second rotatable disk 342, it will be appreciated that an opposite configuration is contemplated. As a non-limiting example, the second rotatable disk 342 can be located axially forward of the first rotatable disk 340. In such a configuration, the arm 343 can extend axially aft of the main body 341 and axially towards the first rotatable disk 340.

While the first rotatable disk 340 is illustrated as axially forward of the second rotatable disk 342, it will be appreciated that an opposite configuration is contemplated. As a non-limiting example, the second rotatable disk 342 can be located axially forward of the first rotatable disk 340. In such a configuration, the arm 343 can extend axially aft of the main body 341 and axially towards the first rotatable disk 340.

During operation, a working airflow 396 flows through the working airflow path 390 and the leakage cavity 392. The interstage cavity 328 is fluidly isolated from the working airflow 396 in the second HP stage 338. A flow of bleed air 332 is fed to the interstage cavity 328 and directed against the inner hoop surface 372. The hoop stiffener 330 directs the flow of bleed air 232 within the first cavity 350 and the second cavity 352.

During operation, the first rotatable disk 340 and the second rotatable disk 342 rotate circumferentially about the engine centerline 302. Looking at just the second rotatable disk 342, the rotation of the second rotatable disk 342 causes stresses to be distributed along the second rotatable disk 342. It is contemplated that the portion of the second rotatable disk 342 having the inner hoop surface 372, specifically the arm 343, can experience the largest stresses if left unchecked. The hoop stiffener 330 is used to stiffen a portion of the second rotatable disk 342. Specifically, the hoop stiffener 330 is used to stiffen the arm 343 by providing an increased rigidity to the arm 343 in comparison with the second rotatable disk 342 formed without the hoop stiffener 330.

It is contemplated that interstage seal 374, specifically the set of fingers 376, is the portion of the second rotatable disk 342 that degrades the fastest. This degradation of the set of fingers 376 is a result of the arm 343 of the second rotatable disk moving radially, with respect to the engine centerline 302, causing the set of fingers 376 to move towards and in some cases contact the wear element 378. Positioning the hoop stiffener 330 along the arm 343 to be axially aligned with the interstage seal 374 stiffens the arm 343, thereby reducing the movement of the arm 343 in comparison to a rotatable disk formed without the hoop stiffener 330. The reduction of the movement of the arm 343 reduces the wear on the set of fingers 376; therefore, increasing the overall lifespan of the second rotatable disk 342 in comparison with the rotatable disk formed without the hoop stiffener 330.

Benefits of the present disclosure include a turbine engine with increased efficiency compared to some other turbine engine. For example, some other turbine engines include a compression section that either cools the later stages of the HP compressor or otherwise has to limit the number of stages in the HP compressor so that the working airflow does not get too hot and cause thermal fatigue. In cases where the some other turbine engine has to cool the later stages of the HP compressor, efficiency losses associated with the use of the flow of bleed air are experienced. The turbine engine, as described herein, however, includes the set of fins that eliminate or otherwise reduce the efficiency losses due to windage losses; thereby, increasing the overall efficiency of the turbine engine. The set of fins and the hoop stiffener are used to direct a flow of cooling fluid (e.g., bleed air) against the rotatable disk. The cooling of the rotatable disk, in turn, allows for a compression section to operate with higher temperatures and higher pressures, thus increasing the overall efficiency of the turbine engine.

To the extent not already described, the different features and structures of the various embodiments can be used in combination, or in substitution with each other as desired. That one feature is not illustrated in all the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine defining an engine centerline, the turbine engine comprising an engine core having a compression section, a combustion section, and a turbine section in serial flow arrangement, the engine core having a rotor portion rotatable about the engine centerline, the engine core defining a working airflow path through which a working airflow passes, a plurality of axially arranged stages located within the compression section, with each stage of the plurality of axially arranged stages having a set of circumferentially spaced blades, the plurality of axially arranged stages having a set of low pressure (LP) stages and a set of high pressure (HP) stages, the set of HP stages having a first HP stage including a first rotatable disk, and second HP stage disposed axially adjacent to the first HP stage, the second HP stage having a second rotatable disk, the second rotatable disk having a main body, the first rotatable disc and the second rotatable disc axially forming an interstage cavity therebetween, the interstage cavity being at least locally fluidly isolated from the working airflow path within the second HP stage, a cooling airflow circuit extending from a portion of the turbine engine upstream of the interstage cavity and opening to the interstage cavity, and a set of fins located within the interstage cavity, the set of fins being rotatable with the rotor portion to impart circulation to a flow of fluid within the interstage cavity from the cooling airflow circuit.

A turbine engine defining an engine centerline, the turbine engine comprising an engine core having a compression section, a combustion section, and a turbine section in serial flow arrangement, the engine core having a rotor portion rotatable about the engine centerline, the engine core defining a working airflow path through which a working airflow passes, a plurality of axially arranged stages located within the compression section, with each stage of the plurality of axially arranged stages having a set of circumferentially spaced blades, the plurality of axially arranged stages having a set of low pressure (LP) stages and a set of high pressure (HP) stages, the set of HP stages having a first HP stage including a first rotatable disk, and a second HP stage disposed axially adjacent to the first HP stage, the second HP stage having a second rotatable disk, the second rotatable disk having a main body, the first rotatable disc and the second rotatable disc axially forming an interstage cavity therebetween, the interstage cavity being at least locally fluidly isolated from the working airflow path within the second HP stage, and a cooling airflow circuit extending from a portion of the turbine engine upstream of the interstage cavity and opening to the interstage cavity, wherein the second rotatable disk comprises a hoop stiffener extending radially inward from the arm and into the interstage cavity, the hoop stiffener terminating within the interstage cavity at a stiffener proximal end.

A turbine engine defining an engine centerline, the turbine engine comprising an engine core having a compression section, a combustion section, and a turbine section in serial flow arrangement, the engine core having a rotor portion rotatable about the engine centerline, the engine core defining a working airflow path through which a working airflow passes, a plurality of axially arranged stages located within the compression section, with each stage of the plurality of axially arranged stages having a set of circumferentially spaced vanes, and a set of circumferentially spaced blades, the plurality of axially arranged stages having a set of low pressure (LP) stages and a set of high pressure (HP) stages, the set of HP stages having a first HP stage including a first rotatable disk, and a second HP stage disposed axially adjacent to the first HP stage, the second HP stage having a second rotatable disk, the second rotatable disk having a main body, the first rotatable disc and the second rotatable disc axially forming an interstage cavity therebetween, the interstage cavity being at least locally fluidly isolated from the working airflow path within the second HP stage, and a cooling airflow circuit extending from a portion of the turbine engine upstream of the interstage cavity and opening to the interstage cavity wherein the second rotatable disk comprises a hoop stiffener extending radially inward into the interstage cavity and being at least partially axially aligned with the interstage seal.

The turbine engine of any preceding clause, wherein the second rotatable disk comprises an arm extending axially outward from the main body and a hoop stiffener extending radially from the arm and into the interstage cavity.

The turbine engine of any preceding clause, wherein the set of fins extend axially from the hoop stiffener.

The turbine engine of any preceding clause, wherein the set of fins include a first group of fins provided on an axially forward surface of the hoop stiffener, and a second group of fins provided on an axially aft surface of the hoop stiffener.

The turbine engine of any preceding clause, wherein the second HP stage includes a set of circumferentially spaced vanes, and the turbine engine further comprises an interstage seal formed radially between the second rotatable disk and the set of circumferentially spaced vanes, the interstage seal being at least partially formed by the second rotatable disk, with the interstage seal and the hoop stiffener being at least partially axially aligned.

The turbine engine of any preceding clause, wherein the hoop stiffener forms a continuous annular ring about the engine centerline.

The turbine engine of any preceding clause, wherein the hoop stiffener is positioned to divide the interstage cavity into a forward cavity and an aft cavity.

The turbine engine of any preceding clause, wherein the second rotatable disk extends towards the engine centerline a first radial distance, and the hoop stiffener extends towards the engine centerline a second radial distance that is less than the first radial distance.

The turbine engine of any preceding clause, wherein the second radial distance is greater than or equal to 10% and less than or equal to 90% of the first radial distance.

The turbine engine of any preceding clause, wherein the second rotatable disk is located axially aft of the first rotatable disk.

The turbine engine of any preceding clause, wherein at least a subset of the set of fins are located along the first rotatable disk.

The turbine engine of any preceding clause, wherein each fin of the set of fins includes a leading edge and a trailing edge, with the subset of the set of fins being arranged such that the leading edge is radially inward from the trailing edge.

The turbine engine of any preceding clause, wherein at least a subset of the set of fins are located along the second rotatable disk.

The turbine engine of any preceding clause, wherein each fin of the set of fins includes a leading edge and a trailing edge, with at least a subset of the fins of the set of fins being arranged such that the leading edge is radially outward from the trailing edge.

The turbine engine of any preceding clause, wherein the set of fins include a first group of fins located along the first rotatable disk, and a second group of fins located along the second rotatable disk.

The turbine engine of any preceding clause, wherein the set of fins are located along opposing portions of both the first rotatable disk and the second rotatable disk.

The turbine engine of any preceding clause, wherein the set of fins are circumferentially spaced with respect to the engine centerline.

The turbine engine of any preceding clause, wherein each fin of the set of fins comprise a suction side and a pressure side.

The turbine engine of any preceding clause, wherein the second HP stage is an axially last stage of the compression section with respect to the engine centerline.

The turbine engine of any preceding clause, further comprising a nacelle at least partially housing the engine core, and a fan section having a fan blade extending radially outward from the nacelle.

The turbine engine of any preceding clause, wherein the second rotatable disk is located axially downstream of the first rotatable disk, and the arm extends axially forward of the main body.

The turbine engine of any preceding clause, wherein the second rotatable disk is located axially forward of the first rotatable disk, and the arm extends axially aft of the main body.

The turbine engine of any preceding clause, wherein the main body extends radially a first radial distance between a disk distal end and the disk proximal end, the hoop stiffener meets with the arm at a transition and extend a second radial distance between the transition and the stiffener proximal end, with the first radial distance being larger than the second radial distance.

The turbine engine of any preceding clause, wherein the second radial distance is greater than or equal to 10% and less than or equal to 90% of the first radial distance.

The turbine engine of any preceding clause, wherein the main body has a first axial thickness located at or near the disk proximal end, the hoop stiffener has a second axial thickness located at or near the stiffener proximal end, and the first axial thickness is larger than the second axial thickness.

The turbine engine of any preceding clause, wherein the second axial thickness is greater than or equal to 10% and less than or equal to 90% of the first axial thickness.

The turbine engine of any preceding clause, wherein the first axial thickness is provided at the disk proximal end.

The turbine engine of any preceding clause, wherein the second axial thickness is provided at the stiffener proximal end.

The turbine engine of any preceding clause, wherein the first axial thickness is a maximum axial thickness of the main body and the second axial thickness is a maximum thickness of the hoop stiffener.

The turbine engine of any preceding clause, further comprising a set of fins located within the interstage cavity, the set of fins being rotatable with the rotor portion to impart circulation to a flow of fluid within the interstage cavity from the cooling airflow circuit.

The turbine engine of any preceding clause, wherein the set of fins are located along the hoop stiffener.

The turbine engine of any preceding clause, wherein the set of fins are located along at least one of a forward surface or an aft surface of the hoop stiffener.

The turbine engine of any preceding clause, wherein each fin of the set of fins include a suction side and a pressure side.

The turbine engine of any preceding clause, wherein the set of fins are located along at least one of the main body of the second rotatable disk or the first rotatable disk.

The turbine engine of any preceding clause, wherein the second HP stage includes a set of circumferentially spaced vanes, and the turbine engine further comprises an interstage seal formed radially between the arm and the set of circumferentially spaced vanes, the interstage seal being at least partially formed by the arm, wherein the interstage seal and the hoop stiffener are at least partially axially aligned.

The turbine engine of any preceding clause, wherein the hoop stiffener forms a continuous annular ring about the engine centerline.

The turbine engine of any preceding clause, wherein the second HP stage is an axially last stage of the compression section with respect to the engine centerline.

The turbine engine of any preceding clause, further comprising a nacelle at least partially housing the engine core, and a fan section having a fan blade extending radially outward from the nacelle.

What is claimed is:

1. A turbine engine defining an engine centerline, the turbine engine comprising:

an engine core having a compression section, a combustion section, and a turbine section in serial flow arrangement, the engine core having a rotor portion rotatable about the engine centerline, the engine core defining a working airflow path through which a working airflow passes;

a plurality of axially arranged stages located within the compression section, with each stage of the plurality of axially arranged stages having a set of circumferentially spaced blades extending through a respective portion of the working airflow path, the plurality of axially arranged stages having a set of low pressure (LP) stages and a set of high pressure (HP) stages, the set of HP stages having:

a first HP stage including a first rotatable disk; and a second HP stage disposed axially adjacent to the first HP stage, the second HP stage having a second rotatable disk, the second rotatable disk having a main body, the first rotatable disk and the second rotatable disk axially forming an interstage cavity therebetween, the interstage cavity being locally fluidly isolated from the respective portion of the working airflow path that includes the set of circumferentially spaced blades of the first HP stage and the second HP stage;

a cooling airflow circuit extending from a portion of the turbine engine upstream of the first HP stage and the second HP stage and opening to the interstage cavity; and a set of fins located within the interstage cavity, the set of fins being rotatable with the rotor portion to impart circulation to a flow of fluid within the interstage cavity from the cooling airflow circuit.

2. The turbine engine of claim 1, wherein the second rotatable disk comprises an arm extending axially outward from the main body and a hoop stiffener extending radially from the arm and into the interstage cavity.

3. The turbine engine of claim 2, wherein the set of fins extend axially from the hoop stiffener.

4. The turbine engine of claim 3, wherein the set of fins include:

a first group of fins provided on an axially forward surface of the hoop stiffener; and a second group of fins provided on an axially aft surface of the hoop stiffener.

5. The turbine engine of claim 2, wherein:

the second HP stage includes a set of circumferentially spaced vanes; and the turbine engine further comprises an interstage seal formed radially between the second rotatable disk and the set of circumferentially spaced vanes, the interstage seal being at least partially formed by the second rotatable disk, with the interstage seal and the hoop stiffener being at least partially axially aligned.

6. The turbine engine of claim 2, wherein the hoop stiffener forms a continuous annular ring about the engine centerline.

7. The turbine engine of claim 2, wherein the hoop stiffener is positioned to divide the interstage cavity into a forward cavity and an aft cavity.

8. The turbine engine of claim 2, wherein the second rotatable disk extends towards the engine centerline a first radial distance, and the hoop stiffener extends towards the engine centerline a second radial distance that is less than the first radial distance.

9. The turbine engine of claim 8, wherein the second radial distance is greater than or equal to 10% and less than or equal to 90% of the first radial distance.

10. The turbine engine of claim 1, wherein the second rotatable disk is located axially aft of the first rotatable disk.

11. The turbine engine of claim 1, wherein at least a subset of the set of fins are located along the first rotatable disk.

12. The turbine engine of claim 1, wherein at least a subset of the set of fins are located along the second rotatable disk.

13. The turbine engine of claim 1, wherein the set of fins include:

a first group of fins located along the first rotatable disk; and a second group of fins located along the second rotatable disk.

14. The turbine engine of claim 1, wherein the set of fins are located along opposing portions of both the first rotatable disk and the second rotatable disk.

15. The turbine engine of claim 1, wherein the set of fins are circumferentially spaced with respect to the engine centerline.

16. The turbine engine of claim 1, wherein the second HP stage is an axially last stage of the compression section, with respect to the engine centerline.

17. The turbine engine of claim 1, further comprising:

a nacelle at least partially housing the engine core; and a fan section having a fan blade extending radially outward from the nacelle.

18. A turbine engine defining an engine centerline, the turbine engine comprising:

an engine core having a compression section, a combustion section, and a turbine section in serial flow arrangement, the engine core having a rotor portion rotatable about the engine centerline, the engine core defining a working airflow path through which a working airflow passes;

a plurality of axially arranged stages located within the compression section, with each stage of the plurality of axially arranged stages having a set of circumferentially spaced blades, the plurality of axially arranged stages having a set of low pressure (LP) stages and a set of high pressure (HP) stages, the set of HP stages having:

a first HP stage including a first rotatable disk; and a second HP stage disposed axially adjacent to the first HP stage, the second HP stage having a second rotatable disk, the second rotatable disk having a main body, the first rotatable disk and the second rotatable disk axially forming an interstage cavity therebetween, the interstage cavity being at least locally fluidly isolated from the working airflow path within the second HP stage;

a cooling airflow circuit extending from a portion of the turbine engine upstream of the interstage cavity and opening to the interstage cavity; and a set of fins located within the interstage cavity, the set of fins being rotatable with the rotor portion to impart circulation to a flow of fluid within the interstage cavity from the cooling airflow circuit wherein each fin of the set of fins comprise a suction side and a pressure side.

19. A turbine engine defining an engine centerline, the turbine engine comprising:

an engine core having a compression section, a combustion section, and a turbine section in serial flow arrangement, the engine core having a rotor portion rotatable about the engine centerline, the engine core defining a working airflow path through which a working airflow passes;

a plurality of axially arranged stages located within the compression section, with each stage of the plurality of axially arranged stages having a set of circumferentially spaced blades, the plurality of axially arranged stages having a set of low pressure (LP) stages and a set of high pressure (HP) stages, the set of HP stages having:

a first HP stage including a first rotatable disk; and a second HP stage disposed axially adjacent to the first HP stage, the second HP stage having a second rotatable disk, the second rotatable disk having a main body, the first rotatable disk and the second rotatable disk axially forming an interstage cavity therebetween, the interstage cavity being at least locally fluidly isolated from the working airflow path within the second HP stage;

a cooling airflow circuit extending from a portion of the turbine engine upstream of the interstage cavity and opening to the interstage cavity; and a set of fins located within the interstage cavity, the set of fins being rotatable with the rotor portion to impart circulation to a flow of fluid within the interstage cavity from the cooling airflow circuit;

wherein at least one of:

at least a first group of the set of fins are located along the first rotatable disk, with each fin of the set of fins including a leading edge and a trailing edge, with the first group of the set of fins being arranged such that the leading edge is radially inward from the trailing edge; or at least a second group of the set of fins are located along the second rotatable disk, with each fin of the set of fins including a leading edge and a trailing edge, with at least the second group of the set of fins being arranged such that the leading edge is radially outward from the trailing edge.

20. The turbine engine of claim 19, wherein the set of fins includes both the first group of the set of fins and the second group of the set of fins.

* * * * *